United States Patent
Lee et al.

(10) Patent No.: US 9,852,817 B2
(45) Date of Patent: Dec. 26, 2017

(54) CONTROL ROD DRIVE MECHANISM BUILT IN NUCLEAR REACTOR

(71) Applicant: Korea Atomic Energy Research Institute, Daejeon (KR)

(72) Inventors: Jae-Seon Lee, Daejeon (KR); Jong-Wook Kim, Daejeon (KR); Tae-Wan Kim, Daejeon (KR); Suhn Choi, Daejeon (KR); Keung-Koo Kim, Daejeon (KR); Jong In Kim, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 794 days.

(21) Appl. No.: 14/518,987

(22) Filed: Oct. 20, 2014

(65) Prior Publication Data
US 2015/0139380 A1 May 21, 2015

(30) Foreign Application Priority Data
Nov. 20, 2013 (KR) .................. 10-2013-0141608

(51) Int. Cl.
G21C 7/14 (2006.01)
G21C 15/08 (2006.01)

(52) U.S. Cl.
CPC .............. *G21C 7/14* (2013.01); *G21C 15/08* (2013.01); *Y02E 30/39* (2013.01)

(58) Field of Classification Search
CPC ... G21C 7/00; G21C 7/06; G21C 7/08; G21C 7/12; G21C 7/14; G21C 7/16
See application file for complete search history.

(56) References Cited

U.S. PATENT DOCUMENTS

2012/0148007 A1* 6/2012 Allen ................. G21C 7/12
376/229

FOREIGN PATENT DOCUMENTS

JP  2006-177882 A   7/2006
KR  10-2011-0137535 A  12/2011

OTHER PUBLICATIONS

Jae-Seon Lee et al., "Preliminary Design Concept for a Reactor-inernal CRDM", Transactions of the Korean Nuclear Society Autumn Meeting, Oct. 24-25, 2013.

* cited by examiner

*Primary Examiner* — Marshall P O'Connor
(74) *Attorney, Agent, or Firm* — Knobbe Martens Olson & Bear LLP

(57) ABSTRACT

Disclosed is a control rod drive mechanism. More specifically, the control rod drive mechanism includes a guide member 100 disposed in a nuclear reactor to receiving a drive shaft 2; a latch assembly 200 disposed in the guide member 100 to enable the drive shaft 2 to be withdrawn and inserted; a supporting member 300 connected to the guide member 100 to cover the drive shaft 2 and to support the latch assembly 200; and a plurality of coil housings 400 spaced apart and connected to the guide member 100 to cover the latch assembly 200, and each having a coil 410 built therein.

4 Claims, 3 Drawing Sheets

100 : [110,130,150]
200 : [210~260]
400 : [410,430,450]

CONTROL ROD DRIVE MECHANISM BUILT IN NUCLEAR REACTOR

CROSS-REFERENCE TO RELATED APPLICATION

This application claims priority to and the benefit of Korean Patent Application No. 10-2013-0141608 filed on Nov. 20, 2013, the disclosure of which is incorporated herein by reference in its entirety.

BACKGROUND

1. Field

The present disclosure relates to a control rod drive mechanism built in a nuclear reactor, which is configured with a coil housing substituting for a latch housing of a latch assembly, to miniaturize the control rod drive mechanism built in the nuclear reactor and thus to secure a sufficient fluid passage of a reactor coolant as well as to enhance space efficiency, and also configured to improve an operating load carrying path of the latch assembly so that the coil housing supports only the weight of a coil, a load of the reactor coolant and a load applied to the coil.

2. Discussion of Related Art

In a control rod drive mechanism built in a nuclear reactor, the Westinghouse Electric Corporation has proposed a configuration using a coil used at a high temperature, which is disclosed in U.S. Patent Application Publication No. 2012/0148007 A1. Here, a drive rod housing is formed of a non-magnetic material to have the same configuration as the housing of the control rod drive mechanism of an existing commercial nuclear reactor, and applied to a design thereof.

However, in spite of the above-mentioned improvement, the control rod drive mechanism built in the nuclear reactor, in which the housing of the control rod drive mechanism or the housing of the latch assembly does not serve as a pressure vessel, also has a housing in which a concept and size are similar to those the housing of the control rod drive mechanism applied to a current commercial nuclear reactor, and thus space efficiency of the control rod drive mechanism and the nuclear reactor is degraded.

Further, in a configuration in which the housing of the latch assembly is formed of one magnetic material or non-magnetic material and installed to extend in a lengthwise direction of the latch assembly, it is impossible to optimize formation of a magnetic field and thus to maximally generate a lifting force.

Also, in the current nuclear reactor, two kinds of methods, i.e., a method of controlling an insertion level of the control rod into the core and a controlling method by injection of a boric acid solution, are used to control reactivity of a reactor core, and thus the control rod need not be inserted into all nuclear fuel.

However, since a large amount of radioactive waste is discharged in the method of controlling the reactivity of the reactor core using the boric acid solution, a nuclear reactor having the boron-free core which controls the reactivity using only the control rod drive mechanism is being developed. To this end, the control rod should be installed and controlled at most of the nuclear fuel.

However, since a size of the current control rod drive mechanism is larger than or the same as a size of a single nuclear fuel, it is impossible to install more control rod drive mechanisms at the current commercial nuclear reactor, and thus it is necessary to reduce the size of the control rod drive mechanism.

Further, in the control rod drive mechanism built in the nuclear reactor, a driving force generating mechanism (particularly, an electromagnet) should be cooled by the reactor coolant, and thus to secure a fluid passage of the reactor coolant flowing around the control rod drive mechanism, it is urgently required to develop a device which may realize miniaturization of the control rod drive mechanism.

SUMMARY

An aspect of the present invention is directed to a control rod drive mechanism built in a nuclear reactor, which is configured with a coil housing substituting for a latch housing of a latch assembly, to miniaturize the control rod drive mechanism built in the nuclear reactor and thus to secure a sufficient fluid passage of a reactor coolant as well as to enhance space efficiency.

Also, another aspect of the present invention is directed to a control rod drive mechanism built in a nuclear reactor, which is configured to improve an operating load carrying path of the latch assembly so that the coil housing substituting for the latch housing supports only the weight of a coil, a load of the reactor coolant and a load applied to the coil.

Also, a further aspect of the present invention is directed to a control rod drive mechanism built in a nuclear reactor, in which a magnetic material and a non-magnetic material are alternately arranged at the coil housing to prevent leakage of a magnetic field, and thus efficiency of a magnetic force generated at the coil is enhanced.

According to an aspect of the present invention, there is provided a control rod drive mechanism including a guide member disposed in a nuclear reactor to receiving a drive shaft; a latch assembly disposed in the guide member to enable the drive shaft to be withdrawn and inserted; a supporting member connected to the guide member to cover the drive shaft and to support the latch assembly; and a plurality of coil housings spaced apart and installed outside of the guide member to cover the latch assembly, and each having a coil built therein.

Each of the coil housings may include an internal member exposed toward an inner side of the guide member, and an external member connected to the internal member to be exposed toward an outer side of the guide member and to form a receiving space for the coil.

The internal member of the coil housing may be configured of a non-magnetic material and a magnetic material that are alternately arranged.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

[Detailed Description of Main Elements]

| | |
|---|---|
| M: magnetic material | NM: non-magnetic material |
| 1: internal structure of a nuclear reactor | 2: drive shaft |
| 3: extension shaft | 4: shaft tooth |
| 10: reactor head | |
| 100: guide member | |
| 110: upper guide | 130: lower guide |
| 150: middle guide | 170: connecting part |
| 200: latch assembly | |
| 210: latch | 220: lifting stator |
| 230: moving latch stator | 240: moving latch plunger |
| 250: stationary latch stator | 260: stationary latch plunger |
| 270: latch housing | 270M: magnetic material of latch housing |
| 270NM: non-magnetic material of latch housing | |
| 300: supporting member | |
| 310: guide window | |
| 400: coil housing | |
| 410: coil | 430: internal member of coil housing |
| 430M: magnetic material of internal member of coil housing | |
| 430NM: non-magnetic material of internal member of coil housing | |
| 450: external member of coil housing | |

DETAILED DESCRIPTION OF EXEMPLARY EMBODIMENTS

Hereinafter, a control rod drive mechanism built in a nuclear reactor according to embodiments of the present invention will be described in detail below with reference to the accompanying drawings.

Figure 3:
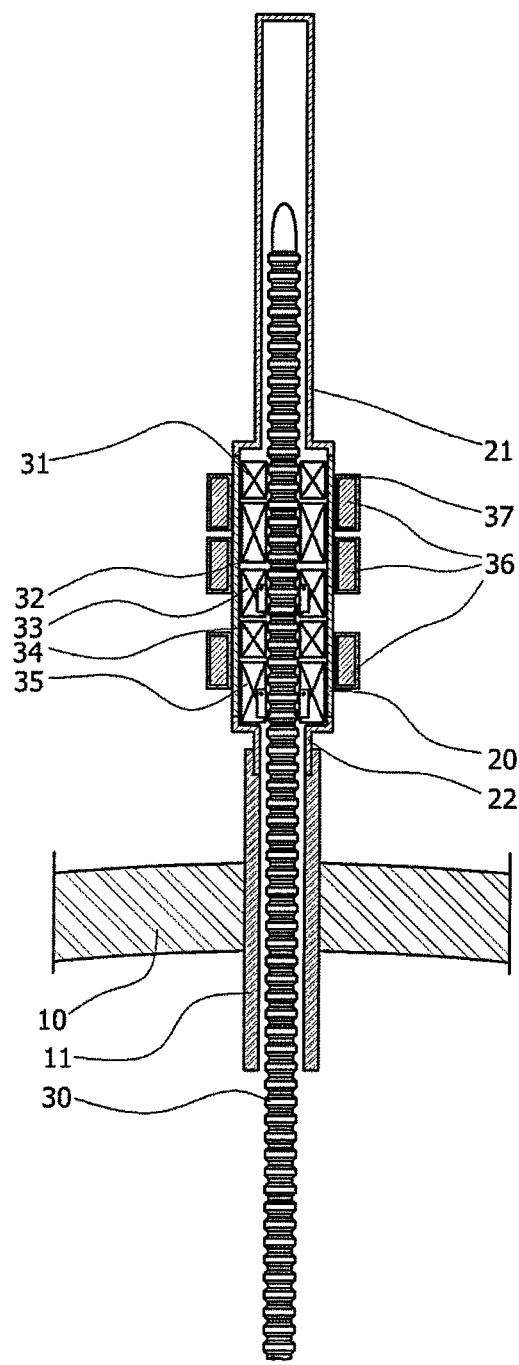
FIG. 3 is a cross sectional view illustrating a conventional control rod drive mechanism.

Referring to FIG. 3, generally, in a control rod drive mechanism of a commercial nuclear reactor, a latch assembly housing 20 (receiving a plurality of stators 31, 32 and 34 and plungers 33 and 35), an upper housing 21 and a lower housing 22 are installed at a nozzle 11 of the control rod drive mechanism, which passes through a reactor head 10, to form part of a reactor coolant pressure boundary, a coil assembly 36 including a coil housing 37 having a built-in coil is provided, a magnetic field is generated to operate a latch assembly, and thus vertical movement of a control rod and extension shaft assembly 30 is induced.

In such a structure, when the housing or the nozzle of the control rod drive mechanism is damaged, there may be a risk of accidents such as a loss of coolant or a control rod ejection.

If a control rod drive mechanism built in a nuclear reactor is applied, since the nozzle of the control rod drive mechanism is removed and the housing of the control rod drive mechanism does not form the reactor coolant pressure boundary, the control rod ejection accident can be fundamentally prevented to enhance safety of the nuclear power plant, the plurality of control rods may be installed so as to realize a boron-free core and thus to minimize related equipment, a passing-through design of a reactor vessel may be simplified, and an amount of radioactive waste may be reduced.

Figure 1:
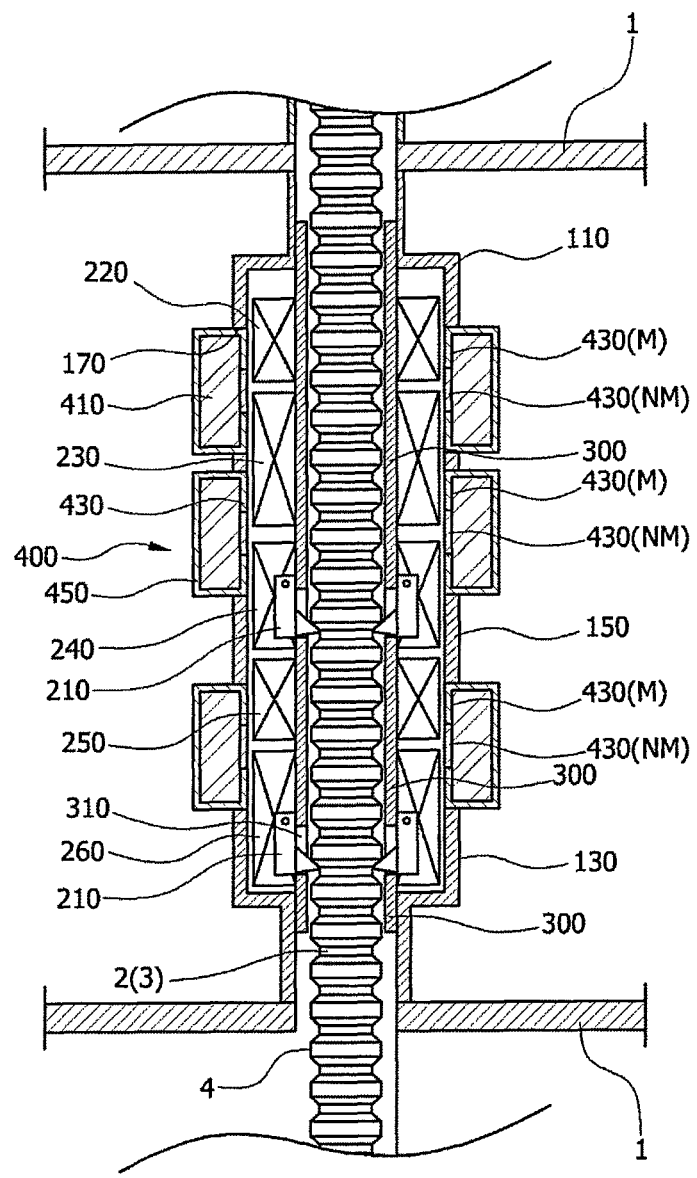
FIG. 1 is a cross sectional view illustrating a control rod drive mechanism built in a nuclear reactor according to an embodiment of the present invention.

The control rod drive mechanism built in the nuclear reactor according to an embodiment of the present invention illustrated in FIG. 1 includes a guide member 100 which is disposed in a nuclear reactor to receive a drive shaft 2, a supporting member 300 which is connected with the guide member 100 to support a latch assembly 200, and coil housings which are spaced apart and installed outside of the guide member 100 to cover the latch assembly, and each having a coil 410 built therein.

The drive shaft 2 serves to insert or withdraw a control rod assembly disposed at a reactor core into/from the reactor core by the control rod drive mechanism according to an embodiment of the present invention.

An extension shaft 3 is connected to a lower portion of each drive shaft 2 to form a control rod and extension shaft assembly, and the control rod connected to the control rod and extension shaft assembly is withdrawn from or inserted into the reactor core by vertical movement of the drive shaft to control the number of neutrons in the reactor core and thus to control an output of the reactor core.

The control rod drive mechanism for this has the guide member 100 connected to an internal structure 1 of a nuclear reactor, and the drive shaft 2 is disposed in the guide member 100.

The guide member 100 includes an upper guide 110 which is fixed to the internal structure 1 of the upper reactor, a lower guide 130 which is fixed to the internal structure 1 of the lower reactor, and a plurality of middle guides 150 which are disposed between the upper guide 110 and the upper guide 130 and connected with the plurality of coil housings 400 to be spaced from each other.

The latch assembly 200 according to an embodiment of the present invention is disposed in the guide member 100 and provided around the drive shaft 2, and includes a lifting stator 220, a moving latching stator 230, a moving latch plunger 240 connected with a latch 210, a stationary latch stator 250, and a stationary latch plunger 260 connected with the latch 210.

In this case, when a current is applied to the coil 410, a magnetic field is generated, and the plunger is moved toward the stator by a mutual attractive force between the stators formed of the magnetic materials and the plungers, such that the latch 210 is engaged with the drive shaft or the latch engaged with the shaft moves up or down.

At this time, a plurality of shaft teeth 4 are formed on an outer circumferential surface of the drive shaft 2, and the latch 210 located between the shaft teeth 4 is moved up or down the drive shaft 2 through vertical movement thereof.

When the drive shaft 2 moves up, the extension shaft 3 also moves up so that the control rod is withdrawn from the reactor core, and thus the output of the reactor core may be increased.

Alternatively, when the drive shaft 2 moves down, the extension shaft 3 also moves down so that the control rod is inserted into the reactor core, and thus the output of the reactor core may be reduced.

In addition, the supporting member 300 according to an embodiment of the present invention is formed to cover the drive shaft 2 and to support the latch assembly 200.

The supporting member 300 is formed in a cylindrical shape, an upper end thereof is coupled and fixed to the upper guide 110 of the guide member 100, and a lower end thereof is coupled and fixed to the lower guide 130 of the guide member 100.

A guide window 310 for the latch 210 is formed in the supporting member 300 to provide a moving space of the latch 210 when the latch 210 moves vertically.

In particular, the supporting member 300 transmits a load acting on the latch 210 of the latch assembly 200 to the internal structure 1 of the nuclear reactor and thus improves an operating load carrying path.

In the control rod drive mechanism according to an embodiment of the present invention, the coil housing 400 has the coil 410 built therein, and forms the magnetic field when the current is applied, and thus operates the latch assembly 200.

Firstly, the plurality of coil housings 400 are fixed to each connecting part 170 disposed between the upper guide 110 of the guide member 100 and the middle guide 150, between the middle guides 150, and between the middle guide 150 and the lower guide 130 to be spaced, and disposed to be spaced vertically.

In this case, each coil housing 400 is coupled to the connecting part 170 and then fixed and coupled to the guide member 100.

Each coil housing 400 disposed at each connecting part 170 of the guide member 100 includes an internal member 430 which is exposed toward an inner side of the guide member 100, and an external member 450 which is connected to the internal member 430 to be exposed toward an outer side of the guide member 100 and to form a receiving space for the coil 410.

That is, each coil housing 400 has a rectangular cross-sectional shape, such that the internal member 430 forms part of an inner surface of the guide member 100 and the external member 450 forms part of an outer surface of the guide member 100, and thus substitutes for a latch housing supporting the existing latch assembly 200.

As described in the background, in the case of a control rod drive mechanism installed at an outer side of the nuclear reactor, the latch housing forms part of a reactor coolant pressure boundary, and the nozzle or the housing of the control rod drive mechanism is damaged, and thus there is a risk of accidents such as loss of coolant or a control rod ejection.

To this end, in the case of the control rod drive mechanism built in the nuclear reactor, the latch housing does not form the reactor coolant pressure boundary, and thus the above-mentioned problem may be solved.

However, although the latch housing does not form the reactor coolant pressure boundary, the latch housing is used as it is. When the boron-free core is applied, it is necessary for the control rod drive mechanism built in the nuclear reactor to be installed at most of the nuclear fuel in the nuclear reactor to control the output of the reactor core.

In this case, since a size of the control rod drive mechanism which is currently used is larger than or the same as that of a single nuclear fuel, it is necessary to install more control rod drive mechanisms at a current commercial nuclear reactor, and thus it is necessary to reduce the size of the control rod drive mechanism.

Further, in the control rod drive mechanism built in the nuclear reactor, reactor coolant should flow to cool heat generated from a driving force generating mechanism (particularly, an electromagnet). In this case, to sufficiently secure a fluid passage of the reactor coolant flowing around the control rod drive mechanism, it is necessary to minimize the control rod drive mechanism.

Therefore, the coil housings 400 according to an embodiment of the present invention are integrally formed with the guide member 100 to reduce the size of the control rod drive mechanism and thereby to realize the miniaturization thereof.

Also, through this, it is possible to secure the sufficient fluid passage for the reactor coolant and thus to enhance cooling efficiency.

Furthermore, the supporting member 300 supports the operating load of the latch 210, and transmits the operating load to the internal structure 1 of the nuclear reactor, and thus the operating load of the latch 210 is not transmitted to the coil housing 400.

Therefore, the coil housing 400 supports only the weight of the coil, the load of the reactor coolant and the load applied to the coil, and thus may enhance structural stability.

In the coil housing 400 according to an embodiment of the present invention, part of the internal member 430 may be formed of a non-magnetic material NM, and the external member 450 and portions of the internal member 430 other than the non-magnetic material NM, may be formed of a magnetic material M, so that the magnetic force is transmitted through the latch assembly 200 with no leakage.

That is, the non-magnetic material NM is disposed at a middle portion of the internal member 430, and the magnetic material M is disposed at portions connected with the middle portion of the internal member 430 and arranged vertically, and the entire external member 450 connected with the portions.

Therefore, the non-magnetic material NM and the magnetic material M are alternately arranged in a vertical direction of the control rod drive mechanism to prevent the leakage of the magnetic field, and the attractive force generated between the stator of the latch assembly 200 and the plunger may be maximized, and thus the driving force of the latch 210 may be optimized.

Further, in the case of the control rod drive mechanism built in the nuclear reactor, which is operated at a high temperature, the magnetic field generated from the coil 410 is formed to be smaller than that formed at a room temperature.

Since the non-magnetic material NM and the magnetic material M are alternately arranged at the coil housings 400, magnetic force transmission efficiency may be increased, and thus operating reliability of the control rod drive mechanism may be ensured.

Figure 2:
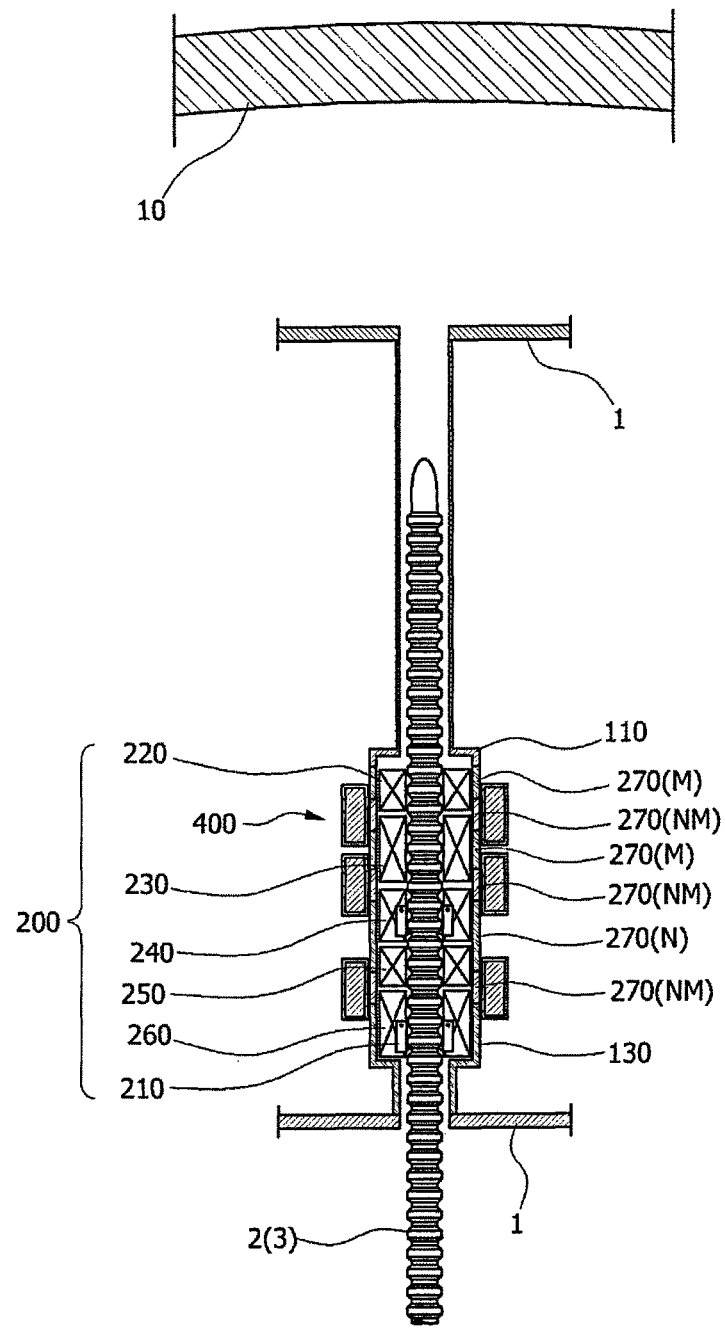
FIG. 2 is a cross sectional view illustrating another modified example of the control rod drive mechanism built in the nuclear reactor according to an embodiment of the present invention.

As illustrated in FIG. 2, in another modified example of the present invention, an existing latch housing 270 may be used as it is, and the latch housings 270 may be welded and connected to each other, such that the non-magnetic material NM and the magnetic material M are alternately arranged. The latch housings 270 located at upper and lower ends are fixed and coupled to the upper guide 110 and the lower guide 130 so as to prevent the leakage of the magnetic field, and the attractive force generated between the stator of the latch assembly and the plunger may be maximized.

Although the supporting member 300 is not illustrated in FIG. 2, unlike FIG. 1, the supporting member 300 may be added in other modified examples according to an embodiment of the present invention. At this time, the supporting member 300 transmits the load acting on the latch 210 of the latch assembly 200 to the internal structure 1 of the nuclear reactor, and thus the operating load carrying path may be improved.

The control rod drive mechanism built in the nuclear reactor according to an embodiment of the present invention can be miniaturized so that the control rod is enabled to be installed at most of the nuclear fuel of the nuclear core, and also can secure the fluid passage so that the reactor coolant flows around the control rod drive mechanism.

Further, according to an embodiment of the present invention the coil housing can substitute for the latch housing so as to improve the operating load carrying path, thereby enhancing the durability of the apparatus.

Furthermore, the magnetic material and the non-magnetic material are alternately arranged at the coil housing to prevent leakage of a magnetic field, and thus the efficiency of the magnetic force generated at the coil is enhanced.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A control rod drive mechanism comprising:
   a shaft elongated along an axis and comprising engagement recesses formed along the axis on a circumference thereof;
   a supporting member defining an elongated channel for receiving the shaft, the supporting member comprising a latch opening therethrough;
   a latch assembly comprising a latch mechanism and a latch operably connected to the latch mechanism, the latch mechanism disposed outside the shaft in a radial direction from the axis, the latch comprising a latch tip extending into the elongated channel via the latch opening and configured to latch the shaft by engagement with one of the engagement recesses;
   a latch housing located outside the supporting member in the radial direction and housing the latch mechanism, wherein the latch housing comprises a latch housing wall disposed outside the latch assembly in the radial direction; and
   a plurality of coil housings disposed outside the latch assembly in the radial direction, each coil housing comprising an inner wall facing the shaft, the inner wall comprising a non-magnetic wall portion and a magnetic wall portion, wherein the plurality of coil housings are arranged along the axis together with the latch housing wall such that the inner walls of the plurality of coil housings and the latch housing wall together provide non-magnetic wall portions and magnetic wall portions that are alternatingly arranged along the axis while facing the shaft.

2. The control rod drive mechanism of claim 1, wherein each of the coil housings comprises an outer wall connected to the inner wall and facing away from the inner wall.

3. The control rod drive mechanism of claim 2, wherein non-magnetic wall portion of each coil housing overlaps a corresponding coil when viewed in a viewing direction perpendicular to the axis.

4. A control rod drive mechanism comprising:
   a shaft elongated along an axis and comprising engagement recesses formed along the axis on a circumference thereof;
   a latch assembly comprising a latch mechanism and a latch operably connected to the latch mechanism, the latch mechanism disposed outside the shaft in a radial direction from the axis, the latch comprising a latch tip extending toward the shaft and configured to latch the shaft by engagement with one of the engagement recesses;
   a latch housing located outside the latch mechanism in the radial direction and housing the latch mechanism, wherein the latch housing comprises non-magnetic wall portions and magnetic wall portions that are alternatingly arranged along the axis while facing the shaft; and
   a plurality of coil housings located outside the latch housing in the radial direction and arranged along the axis.

* * * * *